United States Patent [19]

Miyoshi et al.

[11] Patent Number: 4,504,542
[45] Date of Patent: Mar. 12, 1985

[54] MAGNETIC RECORDING MEDIUM HAVING A SUBBING LAYER OF AMORPHOUS SATURATED POLYESTERS

[75] Inventors: Takahito Miyoshi; Toshimitu Okutu; Masaaki Fujiyama, all of Kanagawa, Japan

[73] Assignee: Fuji Photo Film Co., Ltd., Kanagawa, Japan

[21] Appl. No.: 515,737

[22] Filed: Jul. 21, 1983

[30] Foreign Application Priority Data

Jul. 21, 1982 [JP] Japan ................................ 57-127228

[51] Int. Cl.³ .......................... B32B 7/02; B32B 27/06
[52] U.S. Cl. ................................ 428/336; 252/62.54; 428/480; 428/483; 428/692; 428/694; 428/423.7
[58] Field of Search ...................... 428/692, 694, 423.7, 428/425.9, 480, 483, 475.2, 900, 336; 427/131, 127; 252/62.54

[56] References Cited

U.S. PATENT DOCUMENTS

| 3,387,995 | 6/1968 | Senkpiel et al. | 428/480 |
| 3,730,767 | 5/1973 | Akashi et al. | 428/412 |
| 4,132,552 | 1/1979 | Van Paesschen et al. | 427/131 |
| 4,183,976 | 1/1980 | Yamada et al. | 427/130 |
| 4,210,703 | 7/1980 | Scantlin et al. | 428/900 |

Primary Examiner—George F. Lesmes
Assistant Examiner—William M. Atkinson
Attorney, Agent, or Firm—Sughrue, Mion, Zinn, Macpeak & Seas

[57] ABSTRACT

A magnetic recording medium is disclosed. The medium is comprised of a support base having position thereon a subbing layer and a magnetic layer. The subbing layer is comprised of an amorphous saturated polyester having a glass transition temperature of 10° C. to 60° C. The recording medium provided has excellent adhesiveness between the magnetic layer and the support due to the presence of the subbing layer. Furthermore, the resulting magnetic recording medium provides excellent electromagnetic characteristics such as a desirable video S/N ratio.

7 Claims, 3 Drawing Figures

MAGNETIC RECORDING MEDIUM HAVING A SUBBING LAYER OF AMORPHOUS SATURATED POLYESTERS

FIELD OF THE INVENTION

This invention relates to a magnetic recording medium such as a video tape, an audio tape, a memory tape, a magnetic sheet or a magnetic disc, and more particularly to a magnetic recording medium having excellent durability and adhesiveness between a magnetic layer and a support.

BACKGROUND OF THE INVENTION

Polyethylene terephthalate has recently been used as a support for a magnetic recording medium. Polyethylene terephthalate is stretched and highly crystallized and, therefore, has excellent properties in both resistance against organic solvents and mechanical strength.

A magnetic layer which is obtained by dispersing a ferromagnetic particle in a binder to prepare a coating composition and coating it on a support has an extremely low mechanical strength. Accordingly, a magnetic layer which is prepared without providing a subbing layer on a support can be readily destroyed by the application of a slight force. It is extremely difficult to obtain a magnetic layer which adheres strongly to a support. The simplest and most useful resolution to this problem is to provide a magnetic layer with a snubbing layer.

The composition of a subbing layer is disclosed in U.S. Pat. No. 3,730,767, Japanese Patent Publication No. 10243/74, and Japanese Patent Application (OPI) Nos. 46406/74, 46407/74, 32905/75, 32906/75 and 32907/75 (the term "OPI" as used herein refers to a "published unexamined Japanese patent application"). However, these compositions do not always provide satisfactory results.

SUMMARY OF THE INVENTION

An object of the invention is to provide a magnetic recording medium having an excellent adhesiveness between a magnetic layer and a support.

As the results of various research with regard to the improvement of a composition of a subbing layer, the inventors have found that in a magnetic recording medium comprising a support having provided thereon a subbing layer and a magnetic layer, the object of the invention is attained by incorporating an amorphous saturated polyester having a glass transition temperature (Tg) of 10° C. to 60° C. in a subbing layer.

DETAILED DESCRIPTION OF THE INVENTION

Figure 1:
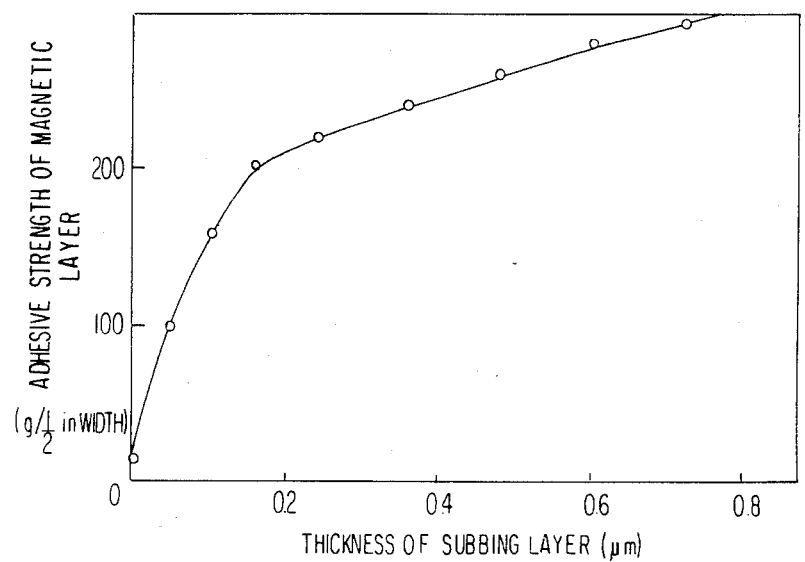
FIG. 1 is a graph showing the relationship between the thickness of the subbing layer and the adhesive strength of magnetic layer.

A magnetic recording medium is disclosed which is comprised of a support base having a subbing layer and a ferromagnetic recording layer provided thereon. The support base may be comprised of any conventional material and the magnetic layer is also comprised of conventional materials such as ferromagnetic powder dispersed within a binder. By providing the subbing layer which includes an amorphous saturated polyester having a glass transition temperature (Tg) of 10° C. to 60° C., there is provided a recording medium having excellent adhesiveness between the magnetic layer and the support. Particularly it is preferred that a subbing layer contains an amorphous saturated polyester having a Tg of 10° C. to lower than 30° C., more preferably 15° C. to 25° C., and an amorphous saturated polyester having a Tg of 30° C. to 60° C., more preferably 35° C. to 55° C., in combination. The mixing ratio of the amorphous saturated polyester having a low Tg to the amorphous saturated polyester having a high Tg is preferably from 95/5 to 50/50, more preferably 90/10 to 60/40, by weight. That is, the glass transition temperature of the subbing layer is adjusted by using two or more kinds of amorphous saturated polyesters having a glass transition temperature of 10° C. to 60° C. in combination. Adhesiveness of a magnetic tape used at a normal temperature is markedly improved with a glass transition temperature of 10° C. to 60° C. It is believed that a glass transition temperature of a subbing layer is lower than that of a magnetic layer and a non-magnetic support, whereby a stress concentration can be dispersed or relieved.

The thickness of the subbing layer is generally 0.03 $\mu m$ to 0.5 $\mu m$ and preferably 0.05 $\mu m$ to 0.3 $\mu m$. If the thickness is thinner than 0.03 $\mu m$, the subbing layer does not sufficiently function to relieve the concentration of stress and adhesiveness is decreased. If the thickness is thicker than 0.5 $\mu m$, it is difficult to obtain a smooth surface of the subbing layer and thus a magnetic tape having high S/N ratio cannot be obtained. Further, the preferred thickness of the subbing layer varies to some extent depending upon the thickness of a magnetic layer. For example, when the thickness of magnetic layer is 3 $\mu m$ or more, the thickness of the subbing layer is preferably 0.1 $\mu m$ or more, more preferably 0.2 $\mu m$ to 0.3 $\mu m$. When the thickness of magnetic layer is less than 3 $\mu m$, it is preferably 0.05 $\mu m$ or more.

The amorphous saturated polyester used for the subbing layer in the invention has a Tg of 10° C. to 60° C. as measured by DSC, a vicat softening point of 20° C. to 80° C. as measured according to ASTM D1525-65T and a shore D hardness of 10 to 80 as measured according to ASTM D2240-68.

The amorphous saturated polyester can be obtained by polycondensation of one or more kinds of dibasic acid and more or more kinds of divalent alcohols. The polyester having a Tg of 10° C. to 60° C. can also be obtained by ester-exchange reaction and polycondensation reaction with a polyester and a divalent alcohol of a different kind.

A dibasic acid which is composed of an amorphous saturated polyester specifically includes a compound having the structure of HOOC—R—COOH (wherein R is optionally selected) such as phthalic acid, azelaic acid, adipic acid, isophthalic acid, terephthalic acid and sebacic acid, and isophthalic acid and terephthalic acid are particularly preferred.

A divalent alcohol includes a compound having the structure represented by HO—R'—OH (R' is optionally selected) such as ethylene glycol, triethylene glycol, neopentyl glycol, ethylene oxide adduct of bisphenol A and diethylene glycol, and ethylene glycol, triethylene glycol and ethylene oxide adduct of disphenol A are particularly preferred.

Above-mentioned two components (dibasic acid and divalent alcohol) each can be used alone or in combination.

Amorphous saturated polyesters having the Tg of 10° C. to 60° C. can be easily obtained by using one or more dibasic acid components and one or more divalent alcohol components in combination and adjusting the mixing ratio of dibasic acid components or divalent alcohol components. For example, when ethylene glycol and triethylene glycol are used in combination as the divalent alcohol component with terephthalic acid as the dibasic acid component, the glass transition temperature of about 10° C. to about 30° C. can be obtained by adjusting the mixing ratio (by mol) of ethylene glycol to triethylene glycol within the range of 1/9 to 5/5.

Amorphous saturated polyesters used in the invention specifically include a polycondensation product of phthalic acid, ethylene glycol and neopentyl glycol, a polycondensation product of adipic acid, phthalic acid, ethylene glycol and neopentyl glycol, a polycondensation product of isophthalic acid, terephthalic acid, ethylene glycol and neopentyl glycol, a polycondensation product of sebacic acid, terephthalic acid, ethylene glycol and neopentyl glycol, a polycondensation product of terephthalic acid, ethylene glycol and triethylene glycol, a polycondensation product of terephthalic acid, ethylene glycol, triethylene glycol and ethylene oxide adduct of bisphenol A, and a polycondensation product of isophthalic acid, ethylene glycol and triethylene glycol. These polyesters are also commercially available in the trade name of "Bayron #103", "Bayron #500", "Bayron #200", "Bayron #300" which are manufactured by Toyobo Co., Ltd., and "STAFIX" which is manufactured by Fuji Photo Film Co., Ltd.

The magnetic layer, ferromagnetic powders, additives and support used in the invention can be conventional ones such as disclosed in U.S. Pat. No. 4,135,016.

The invention will be specifically explained in more detail by the following Examples and comparative Examples. It is readily understood that components, mixing ratios, operations and steps can be changed by those skilled in this art so long as the gist of the invention is not essentially changed.

"Part" means "part by weight" in the following Examples and Comparative Examples.

Adhesive strength of the magnetic layer and video S/N ratio were measured by the following methods.

Method of measuring adhesive strength of a magnetic layer

A part of a magnetic tape having a width of ½ inch was adhered to a sheet of paper with a double-sided adhesive tape. The strength of stripping off the magnetic layer was measured when one end of the magnetic layer was pulled in the same direction as the other end of the magnetic layer, at 23° C., 65% RH.

Method of measuring video S/N ratio

The difference in an S/N ratio between the magnetic tape of the invention and the magnetic tape having no subbing layer as a reference tape was measured using a noise meter "925C" manufactured by Shibasoku Co., Ltd.

A noise level was measured with a high pass filter of 10 KHz and a low pass filter of 4 MHz using a VTR "NV-8300" which is manufactured by Matsushita Electric Industries Co., Ltd.

In the Examples and Comparative Examples, the following composition was used for a magnetic layer.

|  | parts |
| --- | --- |
| $\gamma$-Fe$_2$O$_3$ (Hc. 200 Oe, average particle length: 0.5 $\mu$m, acicular ratio: 10/1) | 300 |
| Copolymer of vinyl chloride-vinyl acetate-vinyl alcohol [copolymerization ratio: 92/3/5 (weight ratio), polymerization degree: 420] | 56 |
| Polyester polyurethane (synthesized from butylene adipate and diphenyl methane diisocyanate, molecular weight: about 80,000) | 24 |
| Electroconductive carbon black (average particle diameter: 30 m$\mu$) | 3 |
| Myristic acid | 4 |
| Silicone oil (dimethyl polysiloxane, polymerization degree: 60) | 0.3 |
| Methyl ethyl ketone | 500 |
| Cyclohexanone | 200 |

The above composition was put in a ball mill, dispersed for 24 hours, added with 20 parts of polyisocyanate (trade name "Desmodule L-75"; 75 wt% ethyl acetate solution of an adduct of 3 mols of tolylene diisocyanate and 1 mol of trimethylolpropane; manufactured by Bayer A.G.), dispersed under high speed shearing force for 1 hour and filtrated with a filter having an average pore diameter of 3 $\mu$m to obtain a magnetic coating composition.

EXAMPLE 1

A stubbing layer having a Tg of +20° C. which was prepared by mixing two types of amorphous saturated polyesters of the present invention (the mixing ratio of one having a low Tg to the other having a high Tg: 60/40 by weight) was coated on a 14 $\mu$m-thick polyethylene terephthalate film to have a thickness of 0.02 $\mu$m to 0.8 $\mu$m and the magnetic layer of the above composition was coated thereon to have a thickness of 5 $\mu$m.

Figure 2:
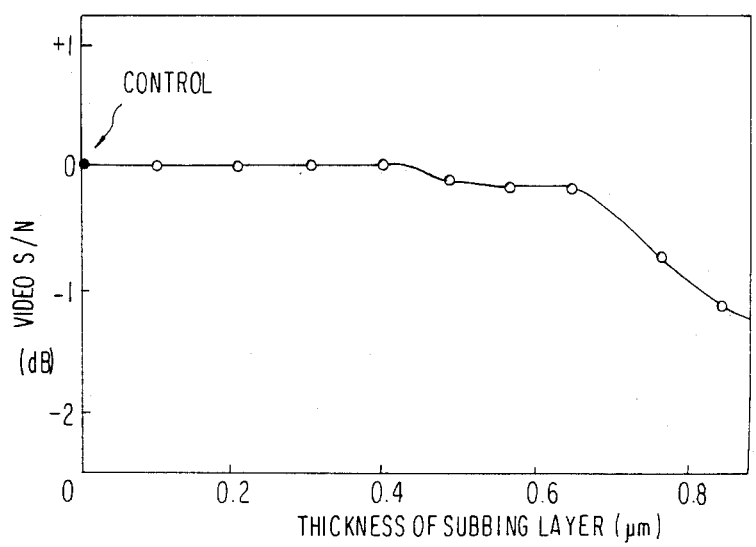
FIG. 2 is a graph showing the relationship between the thickness of the subbing layer and the video S/N.

Thus-obtained samples were evaluated with regard to the adhesive strength of the magnetic layer and video S/N ratio, and the results are shown in FIGS. 1 and 2.

Further, a subbing layer having a Tg of −30° C. to +90° C. which was prepared by mixing two types of amorphous saturated polyesters having various Tg was coated to have a thickness of 0.2 $\mu$m and the magnetic layer of the above composition was coated thereon to have a thickness of 5 $\mu$m, wherein the subbing layer having a Tg of +10° C. to +60° C. was prepared using two types of amorphous polyesters of the present invention.

Figure 3:
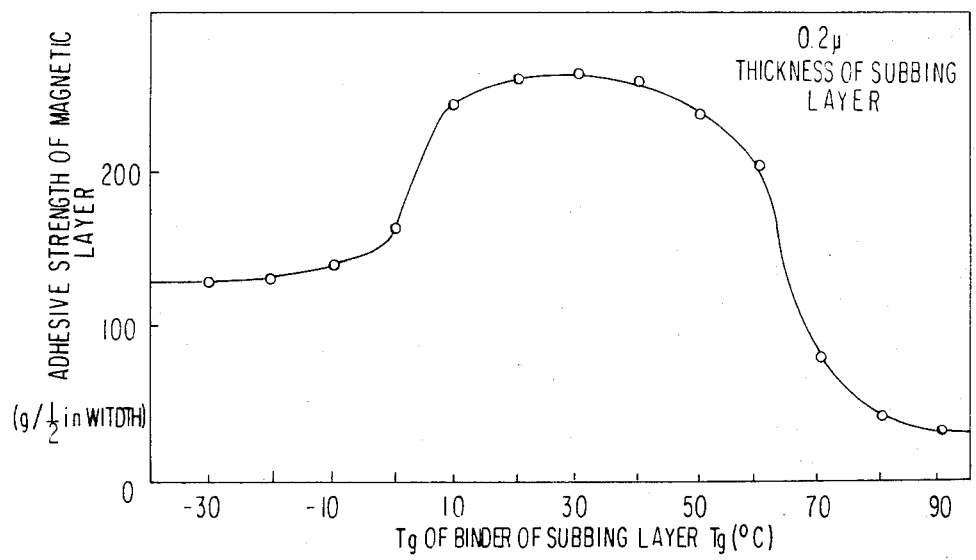
FIG. 3 is a graph showing the relationship between the glass transition point of the binder of the subbing layer and the adhesive strength of the magnetic layer.

Thus-obtained samples were also evaluated with regard to the adhesive strength of the magnetic layer, and the results are shown in FIG. 3.

It is apparent from FIG. 1 that where the subbing layer has a thickness of not less than 0.03 $\mu$m, adhesive force of not less than 100 g/½ inch width can be obtained. It is seen from FIG. 2 that where a subbing layer has a thickness of more than 0.5 $\mu$m, video S/N is deteriorated. Accordingly, it is preferred that the subbing layer has a thickness of 0.03 $\mu$m to 0.5 $\mu$m.

It is also apparent from FIG. 3 that where the Tg of the binder of the subbing layer falls in the range of 10° C. to 60° C., extremely high adhesive strength of the magnetic layer can be obtained. Where a subbing layer has a Tg of not more than 0° C., roll stain and blocking occur during the coating step. Where the Tg of the binder is more than 60° C. the adhesive strength is markedly decreased. Accordingly, it is preferred that a subbing layer contains a binder having a Tg of 10° C. to 60° C.

EXAMPLE 2 AND COMPARATIVE EXAMPLES 1 TO 5

The same procedure as in Example 1 was repeated to obtain a magnetic recording medium except using the compositions of a subbing layer as indicated in Table 1 to prepare a subbing layer having a thickness of 0.2 μm. Amorphous saturated polyesters A, B and C are polycondensation products composed of ethylene glycol, triethylene glycol and ethylene oxide adduct of bisphenol A as divalent alcohol components and terephthalic acid as a dibasic acid component. The Tg of the amorphous saturated polyesters were adjusted by changing the mixing ratio of the divalent alcohol components.

Thus-obtained samples were evaluated with regard to the adhesive strength of the magnetic layer, and the results are shown in Table 1.

TABLE 1

| | Compositions of Subbing Layer (wt %) | | | | | |
|---|---|---|---|---|---|---|
| | Example 2 | Comparative Example 1 | Comparative Example 2 | Comparative Example 3 | Comparative Example 4 | Comparative Example 5 |
| Amorphous saturated polyester A (Tg: 20° C.) | 80 | — | — | 80 | — | 80 |
| Amorphous saturated polyester B (Tg: 50° C.) | 20 | — | 80 | — | 80 | — |
| Amorphous saturated polyester C (Tg: 70° C.) | — | 80 | — | 20 | 20 | — |
| Polycarbonate | — | 20 | — | — | — | 20 |
| Copolymer of vinylidene chloride-acrylonitrile | — | — | 20 | — | — | — |
| Adhesive strength of a magnetic layer (g/½ inch width) | 220 | 20 | 60 | 140 | 30 | 160 |

It is seen from the results in Table 1 that a subbing layer prepared by mixing two types of amorphous saturated polyesters of the present invention provides an excellent adhesive strength of a magnetic layer.

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising a support base having positioned thereon a subbing layer and a magnetic layer, wherein said subbing layer is composed of a first amorphous saturated polyester having a glass transition temperature of 10° C. to lower than 30° C. and a second amorphous saturated polyester having a glass transition temperature of 35° C. to 60° C., wherein the mixing ratio of said first amorphous saturated polyester to second amorphous saturated polyester is from 95/5 to 50/50, by weight, said subbing layer has a thickness of 0.03 μm to 0.5 μm.

2. A magnetic recording medium as claimed in claim 1, wherein said subbing layer is composed of a first amorphous polymer having a glass transition temperature of 15° C. to 25° C. and a second amorphous polymer having a glass transition temperature of 35° to 55° C.

3. A magnetic recording medium as claimed in claim 1, wherein said subbing layer has a thickness of 0.05 μm to 0.3 μm.

4. A magnetic recording medium as claimed in claim 1, wherein the mixing ratio of the amorphous saturated polyester having a glass transition temperature of 10° C. to lower than 30° C. to the amorphous saturated polyester having a glass transition temperature of 30° C. to 60° C. is from 90/10 to 60/40, by weight.

5. A magnetic recording medium as claimed in claim 1, wherein said amorphous saturated polyesters are polycondensation products of a dibasic acid and a divalent alcohol.

6. A magnetic recording medium as claimed in claim 5, wherein said dibasic acid is selected from the group consisting of phthalic acid, azelaic acid, adipic acid, isophthalic acid, terephthalic acid and sebacic acid, and said divalent alcohol is selected from the group consisting of ethylene glycol, triethylene glycol, neopentyl glycol, ethylene oxide adduct of bisphenol A and diethylene glycol.

7. A magnetic recording medium as claimed in claim 5, wherein said amorphous saturated polyesters are selected from the group consisting of a polycondensation product of phthalic acid, ethylene glycol and neopentyl glycol, a polycondensation product of adipic acid, phthalic acid, ethylene glycol and neopentyl glycol, a polycondensation product of isophthalic acid, terephthalic acid, ethylene glycol and neopentyl glycol, a polycondensation product of sebacic acid, terephthalic acid, ethylene glycol and neopentyl glycol, a polycondensation product of terephthalic acid and ethylene glycol and triethylene glycol, a polycondensation product of terephthalic acid, ethylene glycol, triethylene glycol and ethylene oxide adduct of bisphenol A, and a polycondensation product of isophthalic acid, ethylene glycol and triethylene glycol.

* * * * *